United States Patent [19]

Barland

[11] Patent Number: 4,761,114
[45] Date of Patent: Aug. 2, 1988

[54] ARTICULATED HEAD FOR AN INDUSTRIAL ROBOT AND A ROBOT EQUIPPED WITH A HEAD OF THIS TYPE

[76] Inventor: Michel Barland, 32 Allées Paulmy, 64100 Bayonne, France

[21] Appl. No.: 869,880

[22] Filed: Jun. 3, 1986

[30] Foreign Application Priority Data

Jun. 10, 1985 [FR] France ................. 85 08712

[51] Int. Cl.$^4$ ................. B66C 1/00
[52] U.S. Cl. ................. 414/735; 901/26; 901/29; 74/417; 74/665 M
[58] Field of Search ........ 901/29, 26, 20, 28, 901/21-25, 41; 74/665 M, 417; 414/735

[56] References Cited

U.S. PATENT DOCUMENTS

| | | | |
|---|---|---|---|
| 4,499,790 | 2/1985 | Helms | 901/29 X |
| 4,523,100 | 6/1985 | Payne | 901/41 X |
| 4,527,945 | 7/1985 | Passemard et al. | 414/735 |
| 4,624,621 | 11/1986 | Muralcami et al. | 901/29 X |
| 4,637,773 | 1/1987 | Nakashima et al. | 901/29 X |

FOREIGN PATENT DOCUMENTS

| | | |
|---|---|---|
| 0106561 | 4/1984 | European Pat. Off. . |
| 0128544 | 12/1984 | European Pat. Off. . |
| 0133499 | 2/1985 | European Pat. Off. . |
| 3325973 | 4/1984 | Fed. Rep. of Germany . |
| 3432773 | 1/1985 | Fed. Rep. of Germany . |
| 2536690 | 6/1984 | France . |
| WO82/01680 | 5/1982 | PCT Int'l Appl. . |
| 0197709 | 10/1977 | U.S.S.R. . |

Primary Examiner—Robert J. Spar
Assistant Examiner—Jennifer Doyle
Attorney, Agent, or Firm—Wegner & Bretschneider

[57] ABSTRACT

An articulated head for an industrial robot has three axes of rotation and three frames, the movements of rotation of which are controlled by only two driving elements carried by the fixed portion of the wrist which is connected to the robot arm.

13 Claims, 2 Drawing Sheets

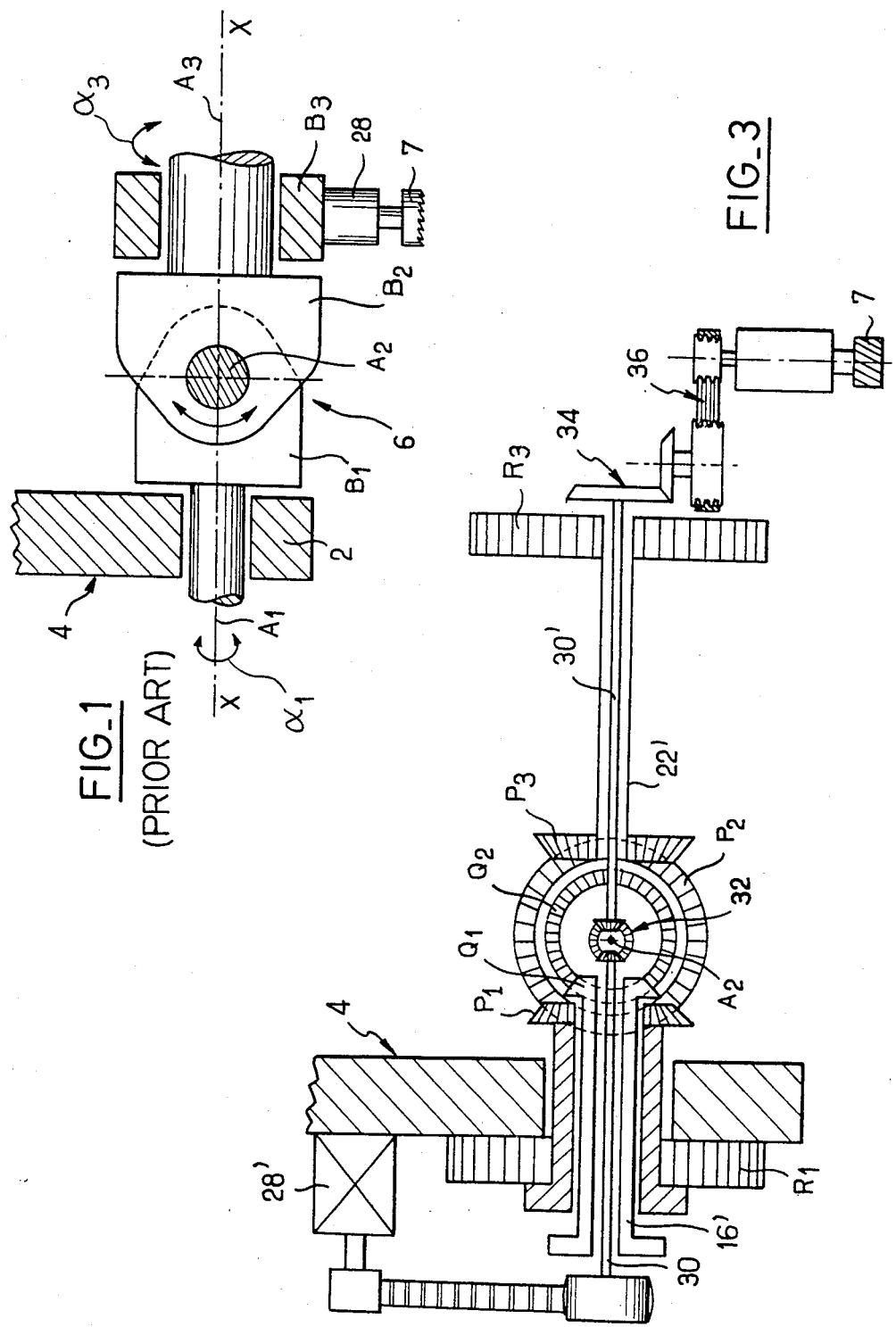

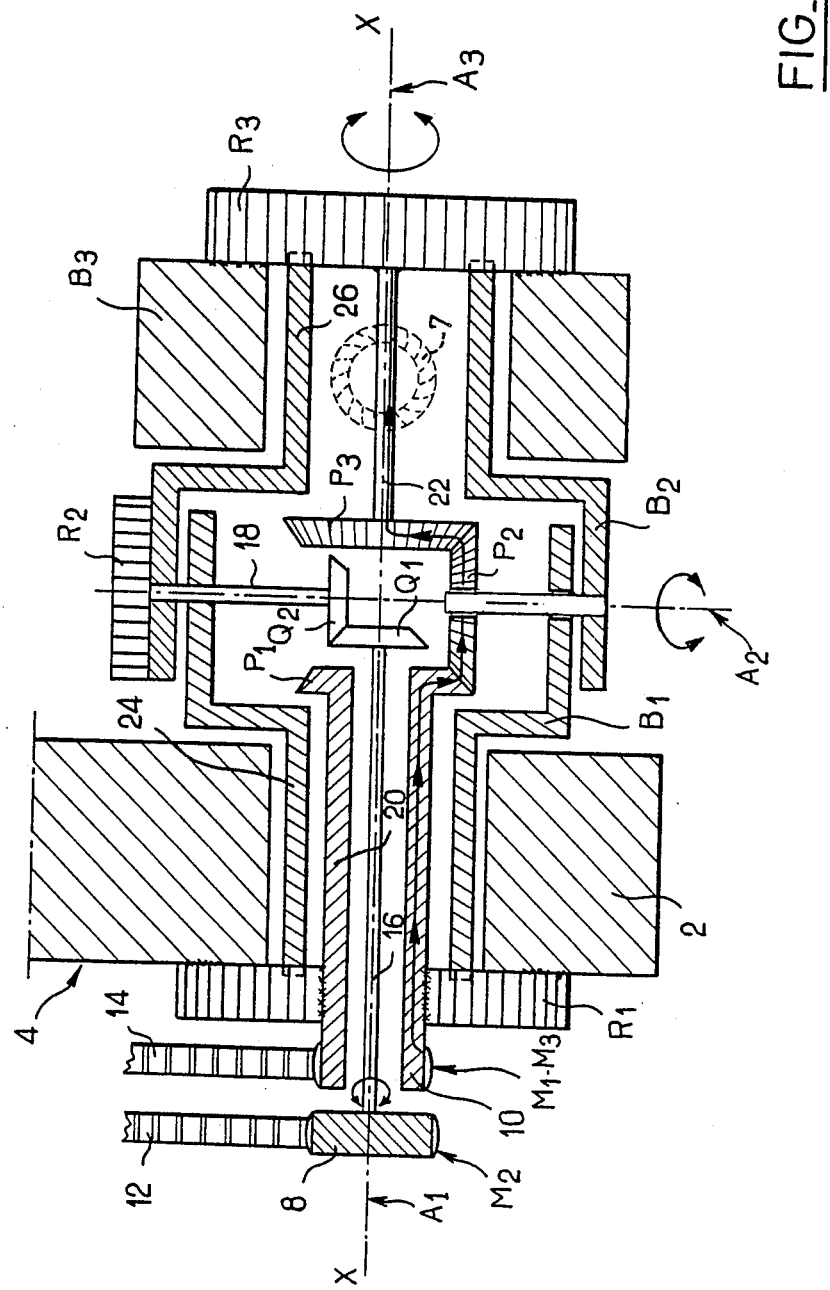

ARTICULATED HEAD FOR AN INDUSTRIAL ROBOT AND A ROBOT EQUIPPED WITH A HEAD OF THIS TYPE

BACKGROUND OF THE INVENTION

1. Field of the Invention

The present invention relates to an articulated head for devices that are designed to carry out automatic positioning and orientation of a tool and are capable of performing industrial operations such as welding, machining, painting and so on, devices of this type being commonly designated by the term "industrial robots".

The "articulated head" or "robot wrist" is the articulated assembly which is mounted at the end of the robot arm and controls the orientation in space of the end effector, or end-of-arm tool.

The invention is more particularly concerned with articulated heads which have three axes of rotation and comprise three movable frames $B_1$, $B_2$, $B_3$ mounted in succession along a longitudinal axis X—X. The first frame $B_1$ is carried by the free end of the robot arm and is rotatable about a first axis $A_1$ with respect to said arm. The second frame $B_2$ is carried by the first frame $B_1$ and is rotatable about a second axis $A_2$ with respect to the first frame. The third frame $B_3$ is carried by the second frame $B_2$ and is rotatable about a third axis $A_3$ with respect to the second frame. The function of said third frame is to support a tool which is positioned and oriented by the robot. The first axis $A_1$ and the third axis $A_3$ are longitudinal axes which coincide with the longitudinal axis X—X in the straight position of the articulated head. The second axis $A_2$ is an intermediate transverse axis which is always perpendicular to the plane containing the axes $A_1$ and $A_3$.

2. Description of the Prior Art

Articulated heads having three axes of rotation of this type are already known. In order to drive these articulated heads and to produce movements of rotation about their three axes, provision is made for three hydraulic motors (or three electric reductiongear motors), at least two of which are housed within the movable frames of the articulated head.

This results in a heavy weight of moving parts and high moments of inertia which are not conducive to rapid movements and impair the accuracy of the articulated head.

In another known articulated head having three axes of rotation of this type, the three hydraulic rotary motors which control respectively each axis of the head are mounted within a control box carried by the robot arm but the transmission of motion between the motors and the axis of rotation controlled by these motors calls for highly complex kinematic chains which are costly and give rise to free relative movements or backlash.

The object of the present invention is to overcome the disadvantages of the known articulated heads by avoiding the need to mount heavy devices such as motors within the movable portions, by reducing the number of motors required and by simplifying the transmissions between the motors and the elements which are actuated by these motors.

SUMMARY OF THE INVENTION

The invention is directed to an articulated head of the aforementioned type in which the distinctive feature lies in the fact that rotational displacement of the frame $B_2$ about the axis of rotation $A_2$ is controlled by a first driving element and that the movements of rotation of the frame $B_1$ about the axis $A_1$ and of the frame $B_3$ about the axis $A_3$ are both controlled by a single common second driving element, the first and second driving elements being carried by the arm of the robot.

By means of the invention, the movements of the head about its three axes of rotation can be obtained by means of only two motors located in the fixed portion of the wrist which is connected to the robot arm. The transmission mechanisms are simplified by virtue of the very fact that one of the motors has been dispensed with.

In accordance with the invention, a first kinematic chain of the type comprising bevel-pinions is interposed between the second driving element and the frames $B_1$, $B_3$ This kinematic chain is so designed that, under the action of any movement of rotation of the second driving element, the frames $B_1$, $B_3$ undergo a pivotal displacement respectively about the axes $A_1$ and $A_2$ through angles $\alpha_1$ and $\alpha_3$ which are always proportional, always have the same direction and preferably always have equal values.

In an articulated head in accordance with the invention, a second kinematic chain of the bevel-pinion type is interposed between the first driving element and the frame $B_2$ in order to displace this latter in pivotal motion with respect to the frame $B_1$ about the axis $A_2$.

The articulated head in accordance with the invention offers an advantage in that it has no "singular point" on the surface (portion of sphere) which can be swept by the tool or end effector carried by the head. A "singular point" can be defined as an orientation of the tool such that it is impossible to modify this orientation in a given plane at a nonzero velocity.

When the tool is on a singular point, the rotation of one of the driving motors does not change the orientation of the tool. Thus, at this singular point, there is no relationship between the angular position of the driving motor and the orientation of the tool. Consequently, the wrist of the robot cannot be properly controlled by the rotation of the motors. The existence of a singular point prevents any possibility of changing from one orientation to an adjacent orientation in a continuous displacement, thus entailing the need for changes or re-positioning of tools.

BRIEF DESCRIPTION OF THE DRAWINGS

Other features of the invention will be more apparent to those skilled in the art upon consideration of the following description and accompanying drawings:

FIG. 1 is a schematic representation of an articulated head of a known type having three axes of rotation to which the present invention applies;

FIG. 2 shows the driving means and kinematic chains of one embodiment of an articulated head in accordance with the invention;

FIG. 3 is a fragmentary schematic view of another embodiment of the invention;

FIG. 4 shows one example of application of the invention.

DESCRIPTION OF THE PREFERRED EMBODIMENTS

The end 2 of a robot arm 4 is illustrated in FIG. 1. As a general rule, said arm 4 can be displaced about three axes (three rectangular axes, for example) by means of a known system which does not form part of the invention. The articulated head 6 is carried by the arm 4 and comprises three movable frames $B_1$, $B_2$, $B_3$ mounted one after another in succession along a longitudinal axis X—X. The frame $B_1$ is capable of rotating with respect to the arm 4 about an axis $A_1$. The frame $B_2$ is pivotally coupled to the frame $B_1$ and is capable of pivotal displacement with respect to this latter about an axis $A_2$. The frame $B_3$ is carried by the frame $B_2$ and is capable of rotating with respect to this latter about an axis $A_3$. The tool to be oriented by the articulated head may consist of a machining tool 7, for example, and is carried by the rotatable frame $B_3$.

In the straight position of the articulated head, the axes of rotation $A_1$ and $A_3$ are longitudinal axes which coincide with the longitudinal axis X—X of the articulated head whilst the axis $A_2$ is an intermediate transverse axis which is always perpendicular to the plane containing the axes $A_1$ and $A_3$.

Articulated heads having three axes of rotation with the relative arrangement of axes described in the foregoing are already known (as in French Pat. No. 2,503,012) and the invention is concerned with this type of articulated head.

There are again shown in FIG. 2 the essential elements consisting of frames $B_1$, $B_2$, $B_3$ and axes $A_1$, $A_2$, $A_3$ which appeared in FIG. 1.

A first driving element $M_2$ and a second driving element $M_1$, $M_3$ are mounted coaxially on the fixed portion of the articulated head, that is to say on the end 2 of the robot arm 4. As shown in FIG. 2, these two driving elements can be constituted by two notched pulleys 8, 10 driven by belts 12, 14 which are in turn driven by two motors (not shown in the drawings), said motors being carried by the robot arm 4.

It will be readily understood that, by way of alternative, the two aforementioned driving elements could be constituted by two motors mounted directly on the arm 4 on the longitudinal axis X—X.

A kinematic chain 16, $Q_1$, $Q_2$, 18 which will hereinafter be described in greater detail connects the first driving element $M_2$ to the frame $B_2$ in such a manner as to cause pivotal displacement of the frame $B_2$ with respect to the frame $B_1$ about the axis of rotation $A_2$ when the first driving element $M_2$ is driven in rotation.

Another kinematic chain which essentially comprises a hollow input shaft 20, three bevel-pinions $P_1$, $P_2$, $P_3$ and an output shaft 22 connects the second driving element $M_1$, $M_3$ both to the frame $B_1$ in order to displace this latter in pivotal motion about the axis $A_1$ and to the frame $B_3$ in order to produce a pivotal displacement of this latter about the axis $A_3$.

This kinematic chain, which will be described in greater detail hereinafter, is so arranged that any movement of rotation of the driving element $M_1$, $M_3$ causes a pivotal displacement of the frames $B_1$ and $B_3$ respectively about the axes $A_1$ and $A_3$ through angles $\alpha_1$ and $\alpha_3$ which always have the same direction, are always proportional and are preferably always of equal value.

It is therefore apparent that the orientation of the articulated head about its three axes of rotation can be controlled by means of only two driving elements which, in addition, are supported by a fixed portion and not by the movable frames of the head.

The kinematic chain 16, $Q_1$, $Q_2$, 18 (which will be designated in the following description by the term "second kinematic chain") is of simple construction and is made up of only a small number of elements: the input shaft 16 which is keyed on the driving element $M_2$ and is coaxial with the axis $A_1$, the bevel-pinion $Q_1$, the bevel-pinion $Q_2$ and the output shaft 18 which is coaxial with the axis $A_2$.

In a simple embodiment of the invention, the output shaft 18 could simply be keyed on the frame $B_2$. In this case, however, it would be advisable to make use of a driving element consisting of a low-speed high-torque motor or else a speed-reducer between the driving element $M_2$ and the input shaft.

In a preferred embodiment which is illustrated in FIG. 2, a speed-reducer $R_2$ is mounted between the output shaft 18 (or the output pinion $Q_2$) and the frame $B_2$. By virtue of this arrangement, relative motion or backlash in the pair of bevel-pinions $Q_1$, $Q_2$ is minimized in the same proportion as the speed reduction ratio.

As shown in FIG. 2, the tubular shaft 20 and shaft 22 will rotate in opposite directions due to the presence of the three bevel gears $P_1$, $P_2$, $P_3$. Due to the presence of the speed reducers $R_1$, $R_3$ which are inversely mounted, the first frame $B_1$ which is driven by tubular shaft 20 and the third frame $B_3$ which is driven by shaft 22 will rotate in the same direction. Due to the speed-reducer $R_1$, the input element (i.e., tubular shaft 20) and the output element (i.e., first frame $B_1$) rotate in the same direction. Due to the speed-reducer $R_3$, the input element (i.e., shaft 22) and the output element (i.e., third frame $B_3$) rotate in the opposite directions.

It is an advantage to make use of a coaxial epicyclic reduction-gear unit but preference is given to the choice of a speed-reducer of the known "harmonic drive" type in which the speed reduction ratio can be 1:100, for example.

As a result of this arrangement of the second kinematic chain and by virtue of the fact that it has only two pinions in mesh, it is possible to obtain minimum total backlash between the driving element $M_2$ and the driven element, namely the frame $B_2$.

The other kinematic chain 20, $P_1$, $P_2$, $P_3$, 22 or first kinematic chain comprises only three bevel-pinions, namely the pinion $P_1$ on the axis $A_1$, the pinion $P_2$ on the axis $A_2$ and the pinion $P_3$ on the axis $A_3$. In spite of this small number of pinions, it is also an advantage for the purpose of minimizing backlash to provide two speed-reducers $R_1$ and $R_3$ in the kinematic chain in order to ensure that the hollow shaft 20, the pinions $P_1$, $P_2$, $P_3$ and the output shaft 22 rotate at high speed or in other words at the speed of the driving element $M_1$, $M_3$ Again in this instance, it is preferable to choose speed-reducers of the harmonic drive type having a speed reduction ratio of 1:100, for example.

The first speed-reducer $R_1$ is carried by the end of the robot arm 4, thus avoiding any increase in inertia of the movable portions of the articulated head. The high-speed central input element of the speed-reducer can be keyed on the hollow shaft 20 (which is driven at the same speed as the pulley 10), the fixed circular spline of the speed-reducer can be rigidly fixed to the robot arm 4, whilst the low-speed output element is keyed on the tubular portion 24 of the frame $B_1$ which is mounted for rotation about the axis $A_1$ within the end 2 of the arm 4.

Similarly, in the case of the speed-reducer $R_3$, its high-speed central input element is keyed on the output shaft 22 of the kinematic chain whilst the fixed circular spline and the low-speed output element are rigidly fixed respectively to the tubular portion 26 of the frame $B_2$ (the frame $B_3$ rotates about this latter) and to the frame $B_3$ which carries the tool 7.

With the reduction ratios of 1:100 indicated earlier, when the pulley 10 (or equivalent driving element $M_1$, $M_3$) rotates by one revolution in either one direction or the other, the speed-reducers $R_1$ and $R_3$ rotate respectively through angles $\alpha_1$ and $\alpha_3$ which are equal to 1/100 of a revolution, both in the same direction. In consequehce, the resultant pivotal movement of the frame $B_3$ is 2/100 of a revolution about the axis $A_3$.

Similarly, when the pulley 8 (or equivalent driving element $M_2$) rotates by one revolution, the speed-reducer $R_2$ undergoes a displacement through 1/100 of a revolution (assuming that the bevel-pinions $Q_1$ and $Q_2$ are in a ratio of 1:1), which means that the frame $B_2$ undergoes a pivotal displacement by 1/100 of a revolution about the axis $A_2$.

The relative movements of the pinions $P_1$, $P_2$, $P_3$ and $Q_1$, $Q_2$ during a rotation about the axis $A_2$ or a rotation about the axes $A_1$, $A_3$ can be corrected by a correction program entered into a computer for controlling the driving elements $M_2$ and $M_1$, $M_3$.

In FIG. 1, the axis of rotation of the machining tool 7 is represented as perpendicular to the axis $A_3$ but it is possible to choose a substantially different orientation of said axis. Said tool can be driven either directly or by belts from a tool motor 28 carried by the frame $B_3$ of the articulated head.

However, as shown diagrammatically in FIG. 3, the spindle motor 28' can be mounted on the fixed portion 4 in order to avoid any increase in weight of the movable portions of the articulated head. In this case, an internal shaft 30, 30' provided with a coupling 32 consisting of three bevel-pinions forming an articulation about the axis $A_2$ is adapted to drive a transmission system comprising pinions and belts 34, 36 for driving the tool 7 carried by the frame $B_3$. As will be readily apparent, the shafts 16, 22 of the embodiment shown in FIG. 2 are replaced by hollow shafts 16', 22'.

By virtue of the simplification of the kinematic chains in an atriculated head in accordance with the invention, accuracy of orientation of the tool can achieve a high standard. In fact, the first kinematic chain comprises only two meshes of teeth (pinion $P_1$ in mesh with pinion $P_2$, pinion $P_2$ in mesh with pinion $P_3$) and the second kinematic chain comprises only a single mesh of teeth (bevel-pinion $Q_1$ in mesh with bevel-pinion $Q_2$). This accordingly avoids the successive accumulations of backlash of free relative movements that are encountered in transmission systems of more complicated types, such free relative movements being also reduced in the same proportion as the speed reduction ratio of the speed-reducers. These latter can in turn have very small values of angular clearances such as, for example, a few minutes of arc.

Finally, the absence of singular points on the portion of sphere swept by the tool in its different orientations makes it possible to machine certain skew sufaces without having recourse to any changes or repositioning of tools.

In the figures, the frames $B_1$ and $B_2$ have been represented diagrammatically by yoke-shaped members for the sake of enhanced clarity of the drawings. In practice, however, these frames rather have the shape of boxes pivoted together along the axis $A_2$, the complete set of pinions ($P_1$, $P_2$, $P_3$, $Q_1$, $Q_2$) being housed within the boxes.

FIG. 4 shows an application of the articulated head 6 in accordance with the invention to a cutting machine which constitutes an industrial robot.

The machine comprises a frame made up of longitudinal beams 38–38' and two transverse beams 40–40' which are fixed on the ground by means of legs 42. The beams 38–38' are adapted to carry guide rails 44–44' for guiding a moving carriage 46 along the X-axis. By means of a transverse guide system 48 for controlling displacements along the Y-axis, the aforementioned carriage 46 is adapted to carry the arm 4 at the end of which is mounted the articulated head 6. In the example shown, the arm 4 is a vertical arm which is capable of vertical motion along the Z-axis.

The machining tool 7 carried by the articulated head 6 which is orientable about three axes is shown in the course of cutting a part 50 to be machined such as the hull of a boat, for example.

What is claimed is:

1. An articulated head for an industrial robot, comprising: at least three movable frames mounted in succession along a longitudinal axis X—X, the first frame being carried by the free end of the robot arm and being rotatable about a first axis with respect to said arm, the second frame being carried by the first frame and rotatable about a second axis with respect to said first frame and the third frame being carried by the second frame and rotatable about a third axis with respect to the second frame, the function of said third frame being to support a tool which is positioned and oriented by the robot, the first axis and the third axis being longitudinal axes which coincide with the longitudinal axis X—X in the straight position of the articulated head and the second axis being an intermediate and transverse axis which is substantially perpendicular to the plane containing the first and third axes, wherein rotational displacement of the second frame with respect to said first frame about the second axis of rotation is controlled by a first driving element, wherein the movements of rotation of the first frame with respect to said arm about the first axis and of the third frame with respect to said second frame about the third axis are in the same direction and are both controlled by a single common second driving element, said driving elements being carried by the robot arm, and wherein a first kinematic chain is interposed between the second driving element and the first and third frames and driven by the second driving element, without imparting any driving action upon said second frame, wherein said kinematic chain being so designed that, under the action of any movement of rotation of said second driving element, the first and third frames undergo a rotational displacement respectively about the longitudinal first and third axes through angles $\alpha_1$, and $\alpha_3$, respectively, with respect to the robot arm and to said second frame, wherein said angles being always proportional and having the same direction.

2. An articulated head according to claim 1, wherein the angles of rotation $\alpha_1$ and $\alpha_3$ are always equal and always have the same direction.

3. An articulated head according to claim 1, wherein a second kinematic chain comprising bevel-pinions is interposed between the first driving element and the second frame in order to displace said second frame with respect to the first frame about the second axis.

4. An articulated head according to claim 3, wherein the first and second kinematic chains comprising bevel-pinions are entirely contained within the first and second frames.

5. An articulated head according to claim 4, wherein first and second bevel-pinions of the first and second kinematic chain, respectively, are placed coaxially along the second axis, said first and second bevel-pinions are placed coaxially along the first axis, a third bevel-pinion of the first kinematic chain being placed on the third axis.

6. An articulated head according to claim 1, wherein a first speed-reducer is interposed between the second driving element and the first frame and wherein a second speed-reducer is interposed between the third bevel-pinion of the first kinematic chain and the third frame.

7. An articulated head according to claim 6, wherein a third speed-reducer is interposed between the output pinion of the second kinematic chain and the second frame.

8. An articulated head according to claim 6, wherein the speed-reducers are substantially epicyclic reduction gears having axes which coincide respectively with the first, second and third axes of rotation.

9. An articulated head according to claim 6, wherein the speed-reducer is carried by the robot arm.

10. An articulated head according to claim 1, wherein the tool carried by said head is a rotary machining tool and wherein the axis of rotation of said tool is oriented substantially at right angles to the third axis of rotation, and wherein the first and second driving elements coaxially operate around the first axis.

11. An articulated head according to claim 10, wherein the tool is driven by a motor carried by the third frame.

12. An articulated head according to claim 10, wherein the tool is driven by a motor carried by the robot arm.

13. The articulated head according to claim 1, in combination with an industrial robot.

* * * * *